United States Patent [19]

Ciokajlo et al.

[11] Patent Number: 4,907,946
[45] Date of Patent: Mar. 13, 1990

[54] RESILIENTLY MOUNTED OUTLET GUIDE VANE

[75] Inventors: John J. Ciokajlo, Cincinnati, Ohio; Daniel S. Vogt, Elsmere, Ky.

[73] Assignee: General Electric Company, Cincinnati, Ohio

[21] Appl. No.: 230,392

[22] Filed: Aug. 10, 1988

[51] Int. Cl.[4] .............................................. F04D 29/64
[52] U.S. Cl. ................................ 415/209.3; 415/135; 415/139
[58] Field of Search ................................ 415/134–139, 415/209.2, 209.3, 209.4, 210.1; 60/39.32

[56] References Cited

U.S. PATENT DOCUMENTS

| | | | |
|---|---|---|---|
| 2,928,648 | 3/1960 | Haines et al. | 415/135 |
| 2,938,336 | 5/1960 | Peterson | 60/39.5 |
| 3,104,525 | 9/1963 | Shields | 60/39.32 |
| 3,314,648 | 4/1967 | Howard | 415/135 |
| 3,403,889 | 10/1968 | Ciokajlo | 415/220 |
| 3,826,088 | 7/1974 | Nash et al. | 60/261 |
| 4,014,627 | 3/1977 | Heurteux | 415/217 |
| 4,249,859 | 2/1981 | Benyi, Jr. et al. | 415/217 |
| 4,305,696 | 12/1981 | Pask | 415/217 |
| 4,369,016 | 1/1983 | Dennison | 415/142 |
| 4,478,551 | 10/1984 | Honeycutt et al. | 415/142 |
| 4,639,189 | 1/1987 | Rosman | 415/217 |
| 4,655,682 | 4/1987 | Kunz et al. | 415/217 |
| 4,710,097 | 12/1987 | Tinti | 415/217 |

FOREIGN PATENT DOCUMENTS 740909  3/1960  United Kingdom ................ 415/217

*Primary Examiner*—Robert E. Garrett
*Assistant Examiner*—John T. Kwon
*Attorney, Agent, or Firm*—Jerome C. Squillaro; Steven J. Rosen

[57] ABSTRACT

An annular cast inner support member is concentrically mounted within an annual cast outer support member for mounting a plurality of radially extending outlet guide vanes within the flowpath of a gas turbine engine. The outlet guide vanes are resiliently connected to the inner and outer support members to control and limit the compressive loading of the outlet guide vanes caused by thermal stresses during engine operation. A resilient clamped interconnection which is particularly suitable for use with ceramic outlet guide vanes includes a bolted and clamped socket assembly which maintains both radial and circumferential compressive forces on the outlet guide vanes at all times, notwithstanding the differences in thermal growth rates between metal and ceramic materials.

38 Claims, 4 Drawing Sheets

RESILIENTLY MOUNTED OUTLET GUIDE VANE

BACKGROUND OF THE INVENTION

1. Field of the Invention

The invention concerns a mounting assembly adaptable for use with either ceramic or metallic outlet guide vane airfoils and particularly relates to a cantilevered, spring loaded mounting assembly which may be preloaded to maintain a compressive force on the airfoils throughout all phases of engine operation and shut down.

2. Description of Prior Developments

With the present demand for higher performance turbine engines has come the need for higher engine operating temperatures. These higher operating temperatures, in the order of 2500° F., have caused designers to turn to ceramic materials for replacing various turbine engine components previously fabricated from metals. Ceramic materials, however, pose their own design problems in that ceramics do not perform as well under tension as they do under compression. Moreover, ceramics generally expand thermally at a rate of approximately one fourth that of metals. This difference in thermal expansion, coupled with the need to maintain ceramics in compression poses a significant problem when ceramic and metal components are coupled or interconnected within a high temperature environment such as within a modern gas turbine engine.

That is, as a turbine engine approaches its operating temperature upon start up, the metal engine components expand more rapidly than the ceramic engine components. This differential expansion can cause the metal components to grow away from the ceramic components to which they are connected and place the ceramic components under an undesirable tensile load. Moreover, the large temperature changes during turbine engine thermal cycling can result in destructive thermal stresses within any metal or ceramic component which is constrained within a rigid structure.

The design considerations noted above are particularly applicable to the design of turbine engine outlet guide vanes which are typically arranged within the engine flow path for removing swirl from the hot exiting exhaust gasses. As the hot motive fluid leaves the turbine buckets of a conventional jet engine turbine, there is frequently present a swirl or tangential component of velocity caused by various factors including tip leakage over bucket ends, and by temperature and velocity stratifications in the fluid issuing from the combustion chamber. Elimination of the turbine exit swirl reduces the energy losses in the flow path downstream from the turbine exit. By redirecting the tangential velocity component into an axial velocity component, the outlet guide vanes add to the total useful thrust produced by the turbine engine.

The outlet guide vanes are usually arranged between inner and outer engine frame members such as the inner and outer casings. The airfoil profile of the outlet guide vanes channels the whirling vertical gasses into a plurality of evenly flowing axial streams which are conducive to optimum afterburner performance. The even axial flow aids in controlling the diffusion of the exiting fluid through the afterburner thereby promoting the full combustion of all oxygen present in the exhaust gasses.

Accordingly, a need exists for a mounting assembly for accommodating metal as well as ceramic outlet guide vanes within the flow path of a modern high temperature gas turbine engine. A further need exists for an outlet guide vane mounting assembly which maintains a compressive load on ceramic outlet guide vanes during all phases of engine operation and shut down. Moreover, a need exists for an outlet guide vane mounting assembly which minimize thermal stresses within the outlet guide vanes as they thermally expand and contract during engine operation.

SUMMARY OF THE INVENTION

The present invention has been developed to solve the problems noted above and therefore has as a primary object the provision of a resilient mounting assembly for turbine engine outlet guide vanes. The mounting assembly incorporates cantilevered beams for applying a compressive force on each outlet guide vane throughout engine operation and shut down.

Another object is to provide an outlet guide vane mounting assembly which allows the outlet guide vanes to thermally expand and contract without excessive constraint so as to minimize thermal stresses within the outlet guide vanes and thereby increase their useful life.

A further object is to provide an outlet guide vane mounting assembly constructed of economical lightweight castings for reducing costs and facilitating assembly by avoiding the use of time consuming welding and riveting operations.

Yet another object is to provide an outlet guide vane mounting assembly which is adapted for use with both metal and ceramic outlet guide vanes and which facilitates the interchange of ceramic outlet guide vanes with metal outlet guide vanes.

Still another object of the invention is the provision of an outlet guide vane assembly which facilitates the replacement and/or repair of individual outlet guide vanes.

Briefly, the present invention includes an annular one piece cast inner support ring mounted concentrically within an annular one piece cast outer support ring. At least one of the support rings is formed with axially extending fingers or beams which serve as cantilevered spring members for resiliently clamping the outlet guide vanes between the support rings. The outlet guide vanes are mounted separately from the turbine frame and therefore require strength only to support their aerodynamic deswirling loads. This arrangement allows for thinner outlet guide vanes which reduce aerodynamic blockage of the flowpath as compared to thicker and heavier outlet guide vanes which also serve as bearing and frame supports in conventional designs.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS.

In the drawings.

In the various Figures of the drawings, like reference characters designate like parts.

DETAILED DESCRIPTION OF THE PREFERRED EMBODIMENTS

Figure 1:
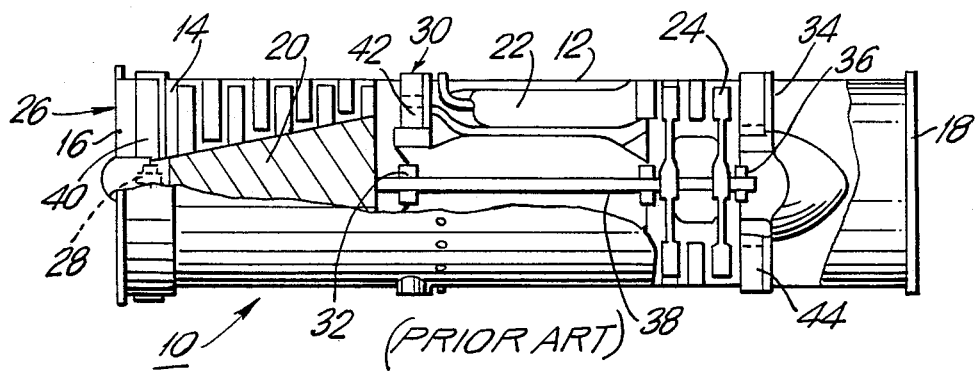
FIG. 1 is a schematic side elevation view, partially in section, of a gas turbine engine showing the general configuration of the gas turbine engine and the location of the turbine engine frame.

A brief description of the major features of a gas turbine engine will aide in the appreciation of the present invention by identifying the location and arrangement of the turbine frame assemblies to which the outlet guide vanes are mounted. Referring first to FIG. 1, a portion of a gas turbine engine (10) is illustrated in partial cross-section. The engine (10) includes an outer casing (12) which surrounds an annular flowpath (14) extending axially between an inlet (16) and an exhaust outlet (18) located at opposite ends of the engine (10).

During engine operation, ambient air is drawn into the inlet (16) and is compressed to a higher pressure in a compressor (20), from which the compressed air is discharged into an annular combustor (22) where fuel is burned to produce high energy products of combustion. From the combustor (22), the motive fluid is directed through a turbine (24) where a portion of its energy is extracted to drive the compressor (20), and the fluid is then discharged as a high energy stream through the exhaust outlet (18).

To maintain the various components of the engine in their proper operating positions relative to each other, engine frame assemblies are provided for rigidly interconnecting the stationary stator components and for providing bearing supports for the rotor. More particularly, the engine (10) includes a front frame assembly (26) supporting a front bearing (28), a mid-frame assembly (30) supporting a mid-shaft bearing (32), and a turbine frame (34) supporting an aft bearing (36). The rotor (38) is rotatably mounted in bearings (28, 32 and 36).

Each frame assembly (26, 30, and 34) respectively includes a plurality of radial support struts (40, 42, and 44) which project across the annular flowpath (14) to interconnect the inner and outer frame members of the frame assemblies. Since the temperature of the motive fluid flowing through the flowpath (14) changes very rapidly during transient engine operation, substantial thermal stresses can be created in the rigid frame assemblies if the struts are allowed to heat up and cool down at rates differing substantially from those of the inner and outer frame members. This is particularly true with respect to the turbine frame assembly (34) since the exhaust gases which surrounds the turbine frame assembly are subject to the most rapid and greatest changes in operating temperatures and resulting thermal stresses.

Accordingly, the outlet guide vane mounting assembly of the present invention, which minimizes such destructive thermal stresses, is illustrated in conjunction with a modified turbine frame assembly analagous to turbine frame (34). However, the present invention is equally applicable to other rigid assemblies, which may also be exposed to motive fluid experiencing substantial and rapid changes in temperature.

Figure 2:
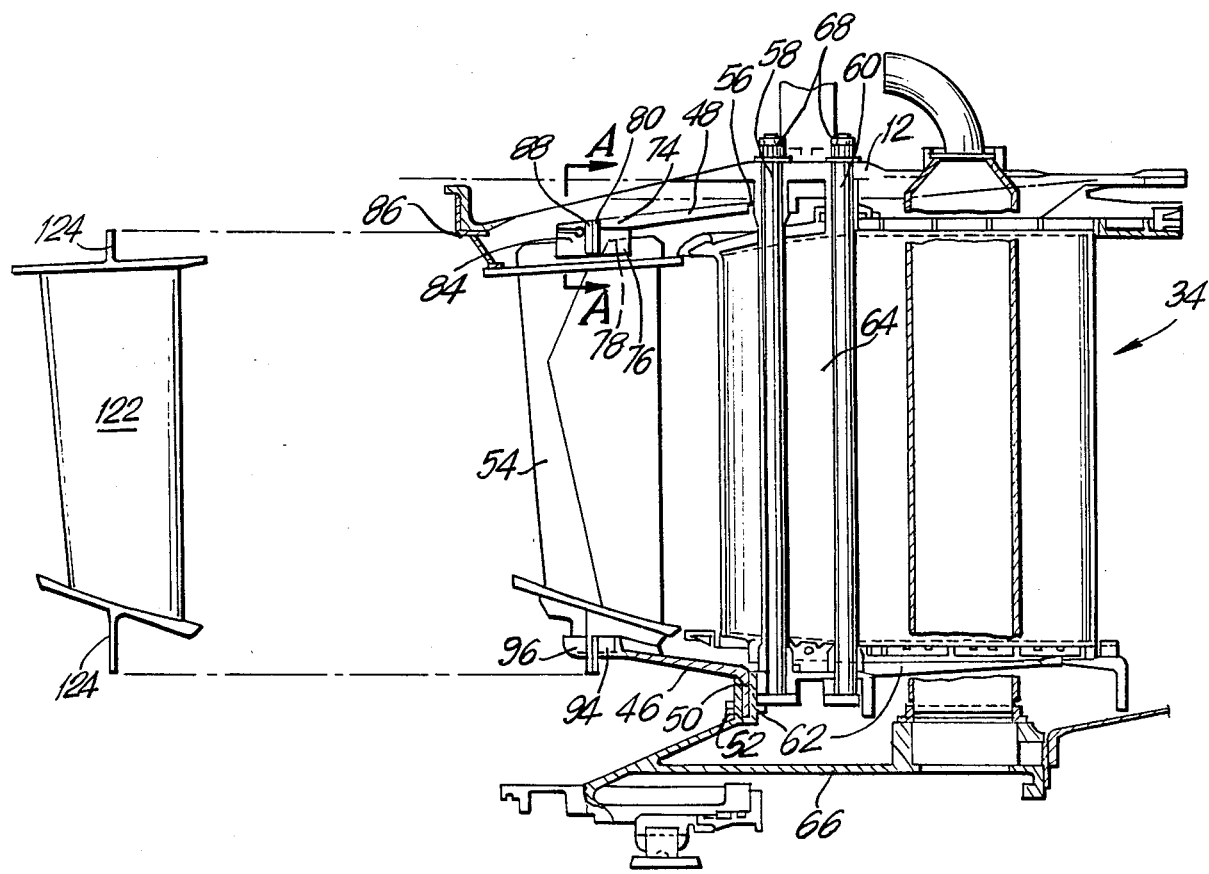
FIG. 2 is a side elevation view of the outlet guide vane mounting assembly connected to a turbine frame and showing the interchangeability between ceramic and metal outlet guide vanes.

Referring now to FIG. 2, the outlet guide vane mounting assembly is shown constructed from an annular 360° inner support member (46) aligned concentrically within an annular 360° outer support member (48). It is preferable to form both the inner and outer support members as one piece metal castings since castings can withstand up to 300° F. higher operating temperatures than corresponding parts fabricated from sheet metal, and in general, castings are more economical than welded or riveted fabrications. Moreover, with appropriate use of electrochemical discharge machining, castings can provide equivalent strength with lighter weight than similar welded or riveted parts. Of course, it is also possible to form the inner and outer support members as segmented or continuous machined rings.

The inner support member (46) may be attached to the turbine frame (34) along an annular flange (50) with removable threaded fasteners (52). The inner support member (46) is preferably formed as a rigid shell to provide firm support to the easily removable and replaceable outlet guide vanes (54). Each outlet guide vane (54) is preferably designed as an uncooled ceramic matrix composite vane which is firmly but resiliently clamped to the inner support member (46) under a compressive spring load provided by the outer support member (48). Preferably, thirty-six outlet guide vanes are evenly spaced in a spoked array between the inner and outer support members (46, 48) to eliminate the tangential or swirling component of the exiting gasses. As best seen in FIG. 2, the outer support member (48) is formed with mounting holes (56) which receive forward frame bolts (58) for attaching the outer support member (48) to the engine frame (34). Forward bolts (56) along with aft bolts (60) are also arranged in a circumferential spoked array to provide a clamping force for clamping the annular outer casing (12) and inner frame ring (62) to radially extending spacer struts (64) positioned between the forward and aft bolts. Ten or twelve spacer struts (64) have been found adequate to provide sufficient strength and rigidity to the engine frame (34), although any number of evenly distributed spacer struts may be used as long as adequate mechanical support is provided. The threaded fasteners (52) which mount the inner support member (46) to the inner frame ring (62) also serve to fasten the inner support member (48) and inner frame ring (62) to an inner casing (66). Inner casing (66) supports aft bearing (36) in a conventional fashion.

The mounting holes (56) are positioned so as to axially and radially locate the outer support member (48) with respect to the engine frame (34), and the forward bolts (58). As seen in detail in FIG. 3, axial slots (70) and radial slots (72) reduce the rigidity of the outer support member (48) and form an annular series of axially extending cantilevered support beams (74) which radially and axially constrain the outlets guide vane boss (100). Each support beam (74) has a radial dimension less than the combined radial dimension of the inner support member (46), vanes (54), and outer boss (100), thereby creating an interference fit and an initial compressive radial load between the support beams (74) and vane assembly (98, 54, and 96).

Support beams (74) act as spring members which deflect radially outwardly upon assembly so as to provide a radially inwardly directed compressive load upon the outlet guide vanes (54). By preloading the outlet guide vanes (54) between the inner and outer support members (46, 48) via radial deflection of support beams (74), a variable but continuous compressive load is maintained upon the outlet guide vanes (54) throughout engine operation and shut down.

This is most desirable in the case of ceramic composite matrix outlet guide vanes which accommodate greater compressive loading than tensile loading.

Another advantage of this spring loaded outlet guide vane mounting assembly is its ability to maintain intimate contact between the ceramic outlet guide vanes (54) and the metal support beams (74) throughout large and rapid changes in temperature, notwithstanding the large difference between their coefficients of thermal expansion. During engine operation, the inner support member (46) and the outlet guide vane (54) are generally hotter than the outer support member (48). This results in the radially outward thermal growth of the inner support member (46) and the outlet guide vane (54) into the cooler outer support member (48). This differential thermal growth results in the application of additional compressive force to the outlet guide vanes. However, because the outer support members (48) engage the outlet guide vanes (54) with a flexible and resilient spring biased contact, the total compressive force on the outlet guide vanes (54) can be easily controlled and limited to acceptable values through appropriate spring design of the support beams (74).

Figure 3:
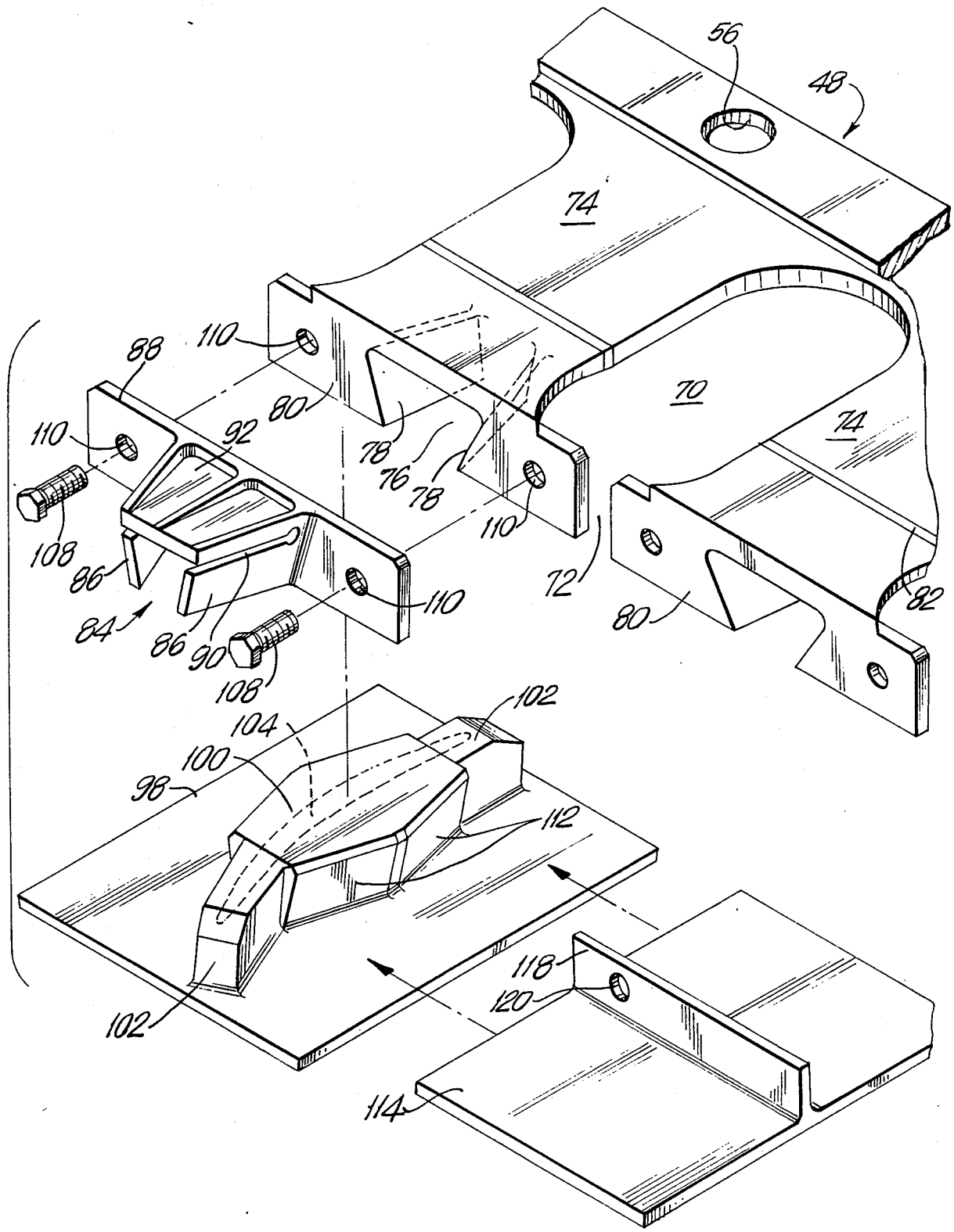
FIG. 3 is an exploded perspective view, partly in section showing the details of the mounting assembly for ceramic outlet guide vanes.
Figure 4:
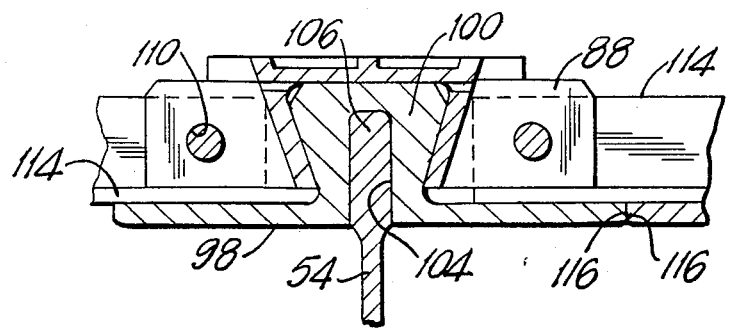
FIG. 4 is a fragmental sectional view taken along line A—A of FIG. 2.
Figure 5:
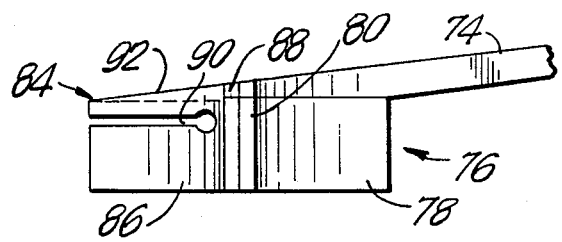
FIG. 5 is an enlarge fragmental side elevational view of the clamping members of FIG. 2.

Additional details of the mounting assembly adapted for ceramic outlet guide vanes are depicted in FIGS. 3, 4 and 5 wherein flanged metal sockets (76) are shown integrally formed around the circumference of the outer support member (48). Each socket (76) is formed with a pair of opposed radially inwardly converging walls (78) which diverge axially forwardly to meet a radially extending mounting flange (80). The sockets (76) including the walls (78) and flange (80) may be separately cost and welded to the beam supports (74) along weld lines (82).

A separate metal socket clamp (84) is formed with a pair of opposed, radially inwardly converging cantelevered walls (86) which diverge axially rearwardly to meet a radially extending mounting flange (88). Slots (90) (FIGS. 3 and 5) are formed between the walls (86) and roof (92) of the socket clamp (84) to allow the walls (86) to act as flexible spring loaded biasing members to secure and clamp the outlet guide vanes (54) to the outer support member (48), as discussed further below. Similar flanged sockets (94) and socket clamps (96) are provided on the inner support member (46) as seen in FIG. 2.

A vane foot support (98) is integrally cast from a ceramic matrix composite material for supporting the radially inner and outer ends of the outlet guide vanes (54) within the sockets (76, 94) and socket clamps (84, 96). Each vane foot support (98) is formed with an elongated generally hexagonal boss (100) having axially projecting ridges (102). An elongated pocket or channel (104) is formed within each boss (100) and axial ridge (102) for receiving a radial end portion (106) (FIG. 4) of each outlet guide vane (54) with a close fit.

The surface profile of each boss (100) generally matches the inner contours of the sockets (76, 94) and the socket clamps (84, 96). However, each boss (100) is dimensioned to form a wedged interference fit between the socket walls (78) and the cantelevered walls (86). Each outlet guide vane (54) is fitted at opposed ends with a vane foot support (98) and positioned within the sockets (76, 94) on the inner and outer support members (46, 48). A pair of socket clamps (84, 96) is then positioned over the exposed portions of the bosses (100) and secured to the inner and outer support members (46, 48) with threaded fasteners (108).

The threaded fasteners (108) (FIG. 3) pass through mounting holes (110) in the mounting flanges (80, 88) and as the threaded fasteners (108) are torqued down, the mounting flanges abut one another to resiliently secure the outlet guide vanes (54) within the sockets (76, 94) and socket clamps (84, 96). As the mounting flanges (80, 88) approach one another, the side faces (112) of the bosses (100) are wedged between the opposed socket walls (78) of the sockets (76, 94) and the opposed cantelevered walls (86) of the socket clamps (84, 96). The cantelevered walls (86) are circumferentially deflected outwardly by the boss (100) during this wedging action so as to provide a resilient circumferential clamping force therebetween.

This clamping force or preloading of the cantelevered walls (86) ensures a continuous tight fit between the ceramic boss (100) and the metal sockets (76, 94) and socket clamps (84, 96) throughout engine operation. Even with the significant difference in thermal growth between these ceramic and metal members during thermal cycling of the turbine engine (10), the outlet guide vanes (54) are securely held in place between the inner and outer support members (46, 48) without being undesirably constrained and overstressed between rigid supports. The resilient support provided by the cantelevered support beams (74) and the cantelevered walls (86) of the socket clamps (84, 96) controls and limits the amount of thermal stresses within the outlet guide vanes (54) within acceptable values.

A metal sealing plate (114) may be applied over abutting edges (116) of the vane foot supports (98), as seen in FIG. 4. A circumferential mounting flange (118) may be formed on each sealing plate (114) and a mounting hole (120) may be formed through the mounting flange (118) to secure the sealing plate (114) to the inner and outer support members (46, 48). The sealing plates (114) restrict the flow of hot gasses through the axial gaps (122) formed between the abutting edges (116) of the vane foot supports (98).

Figure 6:
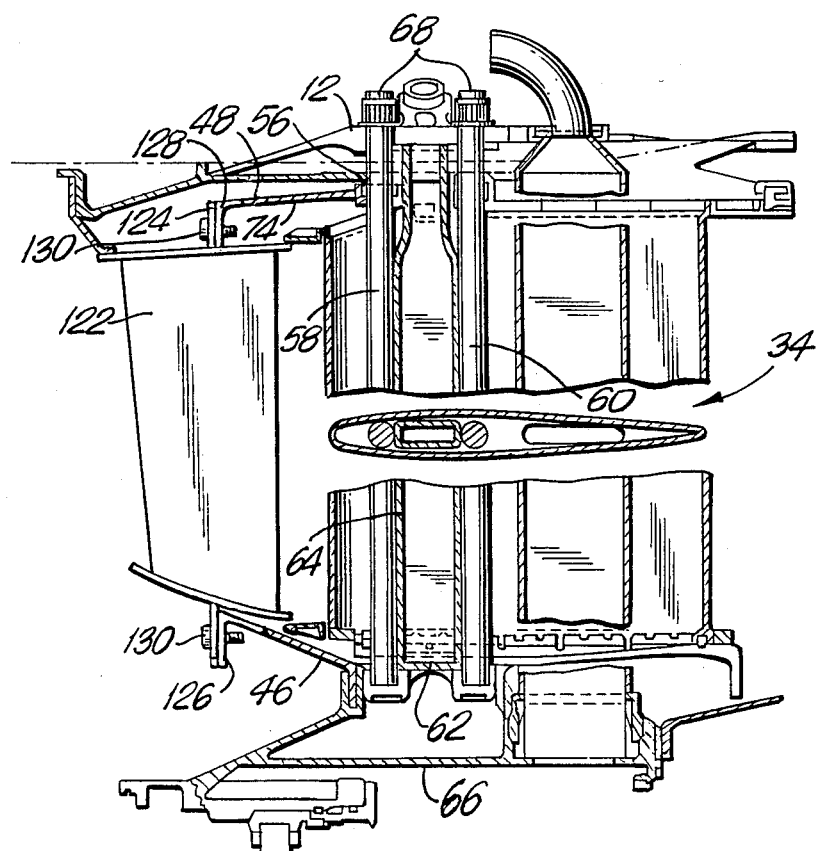
FIG. 6 is a side elevation view of the outlet guide vane mounting assembly adapted for use with metal outlet guide vanes and connected to a turbine frame.
Figure 7:
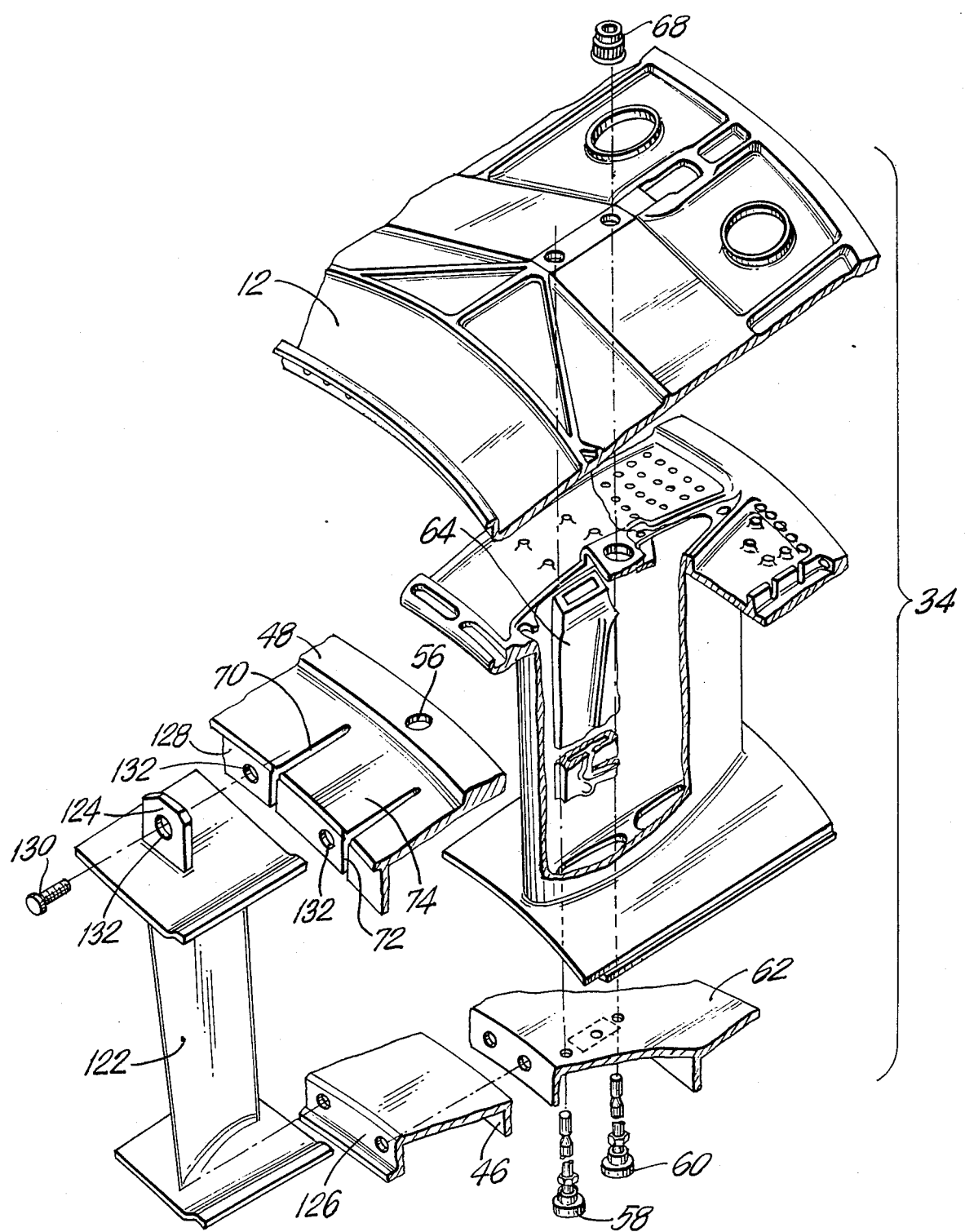
FIG. 7 is a schematic exploded partially sectioned view of the outlet guide vane assembly of FIG. 6.

A modified and somewhat simplified embodiment of the outlet guide vane mounting assembly is shown in FIGS. 6 and 7. This mounting assembly is designed for use with metal outlet guide vanes (122), and eliminates the use of sockets and socket clamps. However, as in the previous embodiment, the outer support member (46) is formed with axial and radial slots (70, 72) to provide the necessary freedom for radial thermal expansion of the outlet guide vanes (122).

Radially extending mounting tabs (124) are provided on opposed ends of the outlet guide vanes (122) for registering with radially extending mounting flanges (126, 128) respectively formed on the inner and outer support members (46, 48). Threaded fasteners (13) passing through mounting holes (132) in the mounting tabs (124) and through the mounting flanges (126, 128) removably secure the outlet guide vanes to the inner and outer support members (46, 48).

Because the outlet guide vanes (54, 122) in both embodiments are not used as structural members to strengthen the engine frame (34), and because these outlet guide vanes are not exposed to high thermal stresses, they may be fabricated with relatively thin cross sections. That is, if the outlet guide vanes (54, 122) were exposed to the high compressive thermal stresses produced by rigid support members, the sections of the outlet guide vanes would have to be increased to withstand such loads. This capability of designing the outlet guide vanes with thin sections is most desirable from an aerodynamic viewpoint as thin sectioned outlet guide vanes avoid choking or blocking the flow of the exhaust gasses passing through the engine flowpath (14), and aid in the uniform diffusion of the exhaust gasses.

It can be appreciated that the outlet guide vane mounting assemblies disclosed above can be economically manufactured and assembled. The bolted interconnection of the inner and outer support members (46, 48) to the engine frame (34) facilitates the replacement or substitution of a ceramic outlet guide vane assembly for a metal outlet guide vane assembly. Moreover, the bolted mounting assembly of the outlet guide vanes (54, 122) to the inner and outer support members (46, 48) greatly facilitates the replacement or repair of individual outlet guide vanes.

There has been disclosed heretofore the best embodiment of the invention presently contemplated. However, it is to be understood that various changes and modifications may be made thereto without departing from the spirit of the invention. For example, the inner support member (46) may be provided with biasing spring members analogous to the support beams (74) formed on the outer support member (48) in addition to or in place or the support beams (74) provided on the outer support member.

What is claimed is:

1. A mounting assembly for resiliently mounting a plurality of outlet guide vanes within the flowpath of a turbine engine, comprising:
    an inner support member for supporting inner radial end portions of said outlet guide vanes within said flowpath;
    an outer support member arranged around said inner annular support member for supporting outer radial end portions of said outlet guide vanes within said flowpath; and
    a plurality of resilient support means operatively associated with one of said inner and outer support members and wherein each of said resilient support means supports a corresponding one of said guide vanes and is used for controlling and limiting compressive thermal stresses applied to corresponding one of said outlet guide vanes during operation and shut down of said turbine engine.

2. The mounting assembly of claim 1, wherein said inner and outer support members each is formed as one piece annular metal castings.

3. The mounting assembly of claim 1, wherein said plurality of resilient support means is provided on said outer support member.

4. The mounting assembly to claim 1, wherein said resilient support means comprises biasing means for applying a compressive radial preload to said outlet guide vanes.

5. The mounting assembly of claim 1, wherein said resilient support means comprises a plurality of axially extending flexible beam members.

6. The mounting assembly of claim 1, wherein said outlet guide vanes are formed of a ceramic material.

7. The mounting assembly of claim 1, wherein said outlet guide vanes are formed of a metal.

8. The mounting assembly of claim 1, wherein one of said inner and outer support members comprises socket means for securing said outlet guide vanes to said mounting assembly.

9. The mounting assembly of claim 8, further comprising clamping means for clamping said outlet guide vanes within said socket means.

10. The mounting assembly of claim 9, wherein said clamping means comprises flexible biasing means for applying a circumferential compressive load on said outlet guide vanes.

11. The mounting assembly of claim 8, further comprising a plurality of vane foot support members fitted over said inner and outer radial end portions of said outlet guide vanes for mounting said outlet guide vanes within said socket means.

12. The mounting assembly of claim 11, wherein each of said vane foot support members is resiliently wedged within said socket means.

13. The mounting assembly of claim 1, further comprising sealing means provided on said inner and outer support members for preventing gasses from escaping said flowpath.

14. The support assembly of claim 1, wherein said inner and outer support members are bolted to said turbine engine to facilitate production assembly of said mounting assembly.

15. The mounting assembly of claim 1, wherein said outlet guide vanes are bolted to said mounting assembly to facilitate assembly and repair of said outlet guide vanes.

16. A mounting assembly for resiliently mounting a plurality of turbine outlet guide vanes within the flowpath of a gas turbine engine, comprising:
    an inner support member for supporting inner radial end portions of said outlet guide vanes within said flowpath;
    an outer support member arranged around said inner annular support member for supporting outer radial end portions of said outlet guide vanes within said flowpath; and
    a plurality of resilient support means operatively associated with one of said inner and outer support members wherein each of said resilient support means supports a corresponding one of said guide vanes and is used for controlling and limiting compressive thermal stresses applied to said one of the outlet guide vanes during operation and shut down of said turbine engine.

17. The mounting assembly of claim 16, wherein said inner and outer support members each is formed as one piece annular metal castings.

18. The mounting assembly of claim 16, wherein said plurality of resilient support means is provided on said outer support member.

19. The mounting assembly of claim 16, wherein said resilient support means comprises biasing means for applying a compressive radial preload to said outlet guide vanes.

20. The mounting assembly of claim 16, wherein said resilient support means comprises a plurality of axially extending flexible beam members.

21. The mounting assembly of claim 20, wherein one of said inner and outer support members comprises socket means for securing said outlet guide vanes to said mounting assembly.

22. The mounting assembly of claim 21, further comprising clamping means for clamping said outlet guide vanes within said socket means.

23. The mounting assembly of claim 22, wherein said clamping means comprises flexible biasing means for applying a circumferential compressive load on said outlet guide vanes.

24. The mounting assembly of claim 21, further comprising a plurality of vane foot support members fitted over said inner and outer radial end portions of said outlet guide vanes for mounting said outlet guide vanes within said socket means.

25. The mounting assembly of claim 24, wherein each of said vane foot support members is resiliently wedged within said socket means.

26. The mounting assembly of claim 16, wherein said outlet guide vanes are formed of a ceramic material.

27. The mounting assembly of claim 16, wherein said outlet guide vanes are formed of a metal.

28. The mounting assembly of claim 16, wherein one of said inner and outer support members comprises socket means for securing said outlet guide vanes to said mounting assembly.

29. The mounting assembly of claim 28, further comprising clamping means for clamping said outlet guide vanes within said socket means.

30. The mounting assembly of claim 29, wherein said clamping means comprises flexible biasing means for applying a circumferential compressive load on said outlet guide vanes.

31. The mounting assembly of claim 28, further comprising a plurality of vane foot support members fitted over said inner and outer radial end portions of said outlet guide vanes for mounting said outlet guide vanes within said socket means.

32. The mounting assembly of claim 31, wherein each of said vane foot support members is resiliently wedged within said socket means.

33. The mounting assembly of claim 16, further comprising sealing means provided on said inner and outer support members for preventing gasses from escaping said flowpath.

34. The support assembly of claim 16, wherein said inner and outer support members are bolted to said turbine engine to facilitate production assembly of said mounting assembly.

35. The mounting assembly of claim 16, wherein said outlet guide vanes are bolted to said mounting assembly to facilitate assembly and repair of said outlet guide vanes.

36. A turbine outlet guide vane mounting assembly for resiliently mounting a plurality of ceramic turbine outlet guide vanes within the flowpath of a turbine engine, comprising:
   a plurality of outlet guide vanes formed of a ceramic material;
   an inner support member for supporting inner radial end portions of said outlet guide vanes within said flowpath;
   an outer support member arranged around said inner annular support member for supporting outer radial end portions of said outlet guide vanes within said flowpath;
   a plurality of axially extending flexible beam members mounted on one of said inner and outer support members wherein said resilient support member supports and is used for controlling and limiting compressive thermal stresses applied to said outlet guide vanes;
   one of said inner and outer support members further comprising socket means for securing said outlet guide vanes to said mounting assembly;
   a boss having a channel for receiving said vane and sloped exterior walls corresponding to sloped interior walls of said socket such that said boss is held within said socket by an interference fit; and
   a socket clamping means for clamping said vanes within said socket means.

37. The turbine outlet guide vane mounting assembly of claim 36, wherein said socket include at least a portion of said axially extending flexible beam members.

38. The turbine outlet guide vane mounting assembly of claim 37, wherein said socket clamping means further comprises;
   a pair of cantelevered axially extending radially sloped inward clamping walls corresponding to exterior walls of said boss; and
   a roof separated from said walls by a slot.

* * * * *